United States Patent
Mizuta

[11] Patent Number: 5,973,893
[45] Date of Patent: *Oct. 26, 1999

[54] MAGNETIC DISK CARTRIDGE IN WHICH SHELL HALVES ARE ACCURATELY POSITIONED AND PROCESS FOR PRODUCING THE SAME

[75] Inventor: Akira Mizuta, Kanagawa-ken, Japan

[73] Assignee: Fuji Photo Film Co., Ltd., Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/579,674

[22] Filed: Dec. 28, 1995

[30] Foreign Application Priority Data

Feb. 6, 1995 [JP] Japan .................................... 7-017695

[51] Int. Cl.⁶ .................................................. G11B 23/03
[52] U.S. Cl. ........................................... 360/133; 369/291
[58] Field of Search ..................................... 360/132–133; 242/348.4, 345.2, 347, 347.2; 369/291

[56] References Cited

U.S. PATENT DOCUMENTS

| | | | |
|---|---|---|---|
| 4,583,144 | 4/1986 | Kato | 360/133 |
| 4,831,482 | 5/1989 | Sato | 360/132 |
| 4,970,618 | 11/1990 | Kato et al. | 360/133 |
| 5,212,614 | 5/1993 | Hughes et al. | 360/133 |
| 5,288,350 | 2/1994 | Kita | 156/73.1 |
| 5,322,585 | 6/1994 | Stanley et al. | 360/132 |
| 5,362,172 | 11/1994 | Hubbling | 360/133 |
| 5,487,802 | 1/1996 | Mizuta et al. | 156/73.1 |
| 5,576,917 | 11/1996 | Shimokuni | 360/132 |

FOREIGN PATENT DOCUMENTS

| | | |
|---|---|---|
| 64-35790 | 2/1989 | Japan . |
| 64-72376 | 3/1989 | Japan . |
| 3-30165 | 2/1991 | Japan . |

Primary Examiner—Brian E. Miller
Attorney, Agent, or Firm—Sughrue, Mion, Zinn, Macpeak & Seas, PLLC

[57] ABSTRACT

In a process for producing a magnetic disk cartridge by welding two cassette shell halves for constituting a cassette shell of a magnetic disk cartridge to each other, a first fitting part is formed on an inner side of one of the two cassette shell halves. The first fitting part serves to adjust the position of the one cassette shell half with respect to the position of the other cassette shell half. A second fitting part is formed on an inner side of the other cassette shell half, which second fitting part is to be fitted to the first fitting part in order to adjust the position of the other cassette shell half with respect to the position of the one cassette shell half. Projections for ultrasonic welding are formed on a fitting surface of at least either one of the first and fitting parts. While the first and second fitting parts are being fitted to each other, energy of ultrasonic welding is concentrated upon the projections for ultrasonic welding, and the two cassette shell halves are thereby welded to each other.

14 Claims, 3 Drawing Sheets

MAGNETIC DISK CARTRIDGE IN WHICH SHELL HALVES ARE ACCURATELY POSITIONED AND PROCESS FOR PRODUCING THE SAME

BACKGROUND OF THE INVENTION

1. Field of the Invention

This invention relates to a magnetic disk cartridge and a process for producing the magnetic disk cartridge. This invention particularly relates to a magnetic disk cartridge, which comprises a cassette shell formed by welding two cassette shell halves to each other, and a process for producing the magnetic disk cartridge.

2. Description of the Prior Art

Magnetic disk cartridges comprise a thin cassette shell and a magnetic disk, which is incorporated in the cassette shell such that it can rotate and on which analog or digital signals are to be recorded magnetically. The cassette shell takes on the form of a flat prismatic shape and comprises an approximately square top surface having an area slightly larger than the area of the magnetic disk, a bottom surface having an opening, through which a center core for supporting the center of the magnetic disk is exposed to the exterior, and a side surface having a narrow width and extending between the periphery of the top surface and the periphery of the bottom surface. The cassette shell is constituted by locating an upper cassette shell half and a lower cassette shell half such that they stand facing each other, and securing them to each other with screws, welding, or the like. The magnetic disk cartridge is provided with openings for insertion of a magnetic head, through which the magnetic head for magnetically recording and reproducing signals is to be inserted from the exterior such that the magnetic head can be brought into contact with the surfaces of the magnetic disk or can be brought to positions close to the surfaces of the magnetic disk. Also, the magnetic disk cartridge is provided with a shutter for opening and closing the openings for insertion of the magnetic head. When the magnetic disk cartridge is not being used, the shutter closes the openings for insertion of the magnetic head such that dust, debris, or the like, may not enter into the magnetic disk cartridge.

Recently, a magnetic disk cartridge, which has a recording capacity that is 50 times as large as the recording capacity of conventional magnetic disk cartridge (3.5-inch FD) by virtue of high-density recording (and is slightly larger than 3.5 inches), has been developed. In the developed magnetic disk cartridge, the magnetic disk is rotated at a markedly higher speed than the speed at which the magnetic disk in the conventional magnetic disk cartridges is rotated. Also, when signals are recorded on the magnetic disk accommodated in the developed magnetic disk cartridge and are reproduced therefrom, the position of the magnetic disk must be adjusted with a very high accuracy with respect to a magnetic head.

In order to satisfy the requirements for the high positioning accuracy, the accuracy of the dimensions of the cassette shell of the magnetic disk cartridge must be high. In particular, the positions of the two cassette shell halves to be combined and secured to each other must be adjusted accurately and must then be secured to each other. For such purposes, welding is advantageous over the use of screws. With welding, there is no risk that looseness or disengagement of the cassette shell halves is produced after they have been secured to each other. However, in order for ultrasonic welding to be carried out, projections or protruding strips (both will hereinbelow be referred to as the projections), which serve as energy directors (ED's) for concentrating energy of ultrasonic waves, must be formed on the surface to be welded. In addition, it is necessary to use a combination of a positioning pin and a pin receiver for accurately adjusting the positions of the two cassette shell halves with respect to each other during the welding. In particular, the projections for the welding are formed on the surfaces of the two cassette shell halves, which face each other. Therefore, if the projections are formed on the surfaces perpendicular to the fitting direction, along which the two cassette shell halves are moved towards each other and brought into contact with each other during the fitting step, the thickness of the entire cassette shell after being formed by the fitting of the two cassette shell halves to each other will fluctuate in accordance with the extent of the welding. Further, shift in positions of the two cassette shell halves and warp thereof occur depending on how the positioning pin and the pin receiver are formed. These problems are detrimental for the cassette shell, which is required to have accurate dimensions.

Also, besides the combination of the positioning pin and the pin receiver described above, it is necessary for protruded structures to be located on the inner surfaces of the cassette shell halves. From the viewpoint of the cost of molds for the molding step, prevention of deformation after the molding step, and product management, it is not desirable to have protruded structures provided on the inner surfaces of the cassette shell halves.

Therefore, it is desired that the structures of the cassette shell halves to be welded to each other by the ultrasonic welding are kept as simple as possible.

SUMMARY OF THE INVENTION

The primary object of the present invention is to provide a magnetic disk cartridge, wherein the accuracy of fitting of two cassette shell halves to be fitted and welded to each other by ultrasonic welding is high, and structures of the cassette shell halves are simple.

Another object of the present invention is to provide a process for producing the magnetic disk cartridge.

The present invention provides a process for producing a magnetic disk cartridge, in which two cassette shell halves for constituting a cassette shell of a magnetic disk cartridge are welded to each other, a magnetic disk being incorporated in the cassette shell such that the magnetic disk can rotate, wherein the improvement comprises the steps of:

i) forming a first fitting part on an inner side of one of the two cassette shell halves, the first fitting part serving to adjust the position of the one cassette shell half with respect to the position of the other cassette shell half, ii) forming a second fitting part on an inner side of the other cassette shell half, which is to be fitted to the first fitting part in order to adjust the position of the other cassette shell half with respect to the position of the one cassette shell half, iii) forming projections for ultrasonic welding on a fitting surface of at least either one of the first fitting part and the second fitting part, and iv) while the first fitting part and the second fitting part are being fitted to each other, concentrating energy of ultrasonic welding upon the projections for ultrasonic welding of the two cassette shell halves.

When the two cassette shell halves are fitted to each other and the cassette shell is thereby formed, the first fitting part and the second fitting part are fitted to each other and serve as a combination of a positioning pin and a pin receiver for adjusting the positions of the two cassette shell halves with respect to each other. The first fitting part and the second fitting part include projection-like parts projected in the fitting direction (i.e., in the direction along which the two cassette shell halves are moved towards each other during the fitting step).

In order for the fitting accuracy to be high and in order for the position adjustment during the fitting step to be facilitated, instead of the fitting surfaces being parallel to the direction along which the two cassette shell halves are moved towards each other and fitted to each other, it is desirable that at least either one of the fitting surfaces (i.e., the surfaces which are fitted to each other during the fitting step and contribute to adjust their positions with respect to each other) is slightly inclined with respect to the fitting direction. Specifically, for example, in cases where a positioning pin and a hole for receiving the positioning pin are fitted to each other, at least either one of the fitting surfaces of the positioning pin and the pin-receiving hole should preferably be constituted of a conical surface. In such cases, the conical fitting surface can serve as a guide during the fitting step, and the positions of the two cassette shell halves with respect to each other can be adjusted easily. If the fitting surfaces are parallel to the direction along which the two cassette shell halves are moved towards each other and fitted to each other, there must be a certain allowance (a gap) between the positioning pin and the pin-receiving hole, and the positions of the two cassette shell halves with respect to each other cannot be adjusted accurately. Therefore, particularly when the positions of the two cassette shell halves with respect to each other should be adjusted accurately, the use of the fitting surfaces parallel to the direction along which the two cassette shell halves are moved towards each other and fitted to each other, is not advantageous.

The present invention also provides a magnetic disk cartridge, in which two cassette shell halves are welded to each other by ultrasonic welding, wherein the improvement comprises:

i) a first fitting part being formed on an inner side of one of the two cassette shell halves, the first fitting part serving to adjust the position of the one cassette shell half with respect to the position of the other cassette shell half, ii) a second fitting part being formed on an inner side of the other cassette shell half, which is to be fitted to the first fitting part in order to adjust the position of the other cassette shell half with respect to the position of the one cassette shell half, iii) projections for ultrasonic welding being formed on a fitting surface of at least either one of the first fitting part and the second fitting part, and iv) the first fitting part and the second fitting part being fitted to each other, the two cassette shell halves being welded to each other.

The fitting surface of at least either one of the first fitting part and the second fitting part may be constituted as a fitting surface inclined with respect to the direction along which the two cassette shell halves are moved towards each other and fitted to each other, and the projections for ultrasonic welding may be formed on the inclined fitting surface. In such cases, from the viewpoint of easiness and reliability of the position adjustment, the inclined fitting surface should preferably be constituted of a surface of a conical or pyramidal shape having its axis extending in the direction along which the two cassette shell halves are moved towards each other and fitted to each other. Also, the fitting surfaces of both of the first fitting part and the second fitting part may be constituted of surfaces of conical or pyramidal shapes having a common axis extending in the direction along which the two cassette shell halves are moved towards each other and fitted to each other.

With the magnetic disk cartridge and the process for producing a magnetic disk cartridge in accordance with the present invention, the first fitting part is formed on the inner side of one of the two cassette shell halves, and the second fitting part is formed on the inner side of the other cassette shell half. Also, the projections for ultrasonic welding are formed on the fitting surface of at least either one of the first fitting part and the second fitting part. The first fitting part and the second fitting part are fitted to each other, and the two cassette shell halves are thus welded to each other. Therefore, the fitting parts serve both as a combination of a positioning pin and a pin receiver and include projections for welding. Accordingly, it is not necessary for independent projections for the welding to be provided besides the combination of the positioning pin and the pin receiver, and the structures of the two cassette shell halves can be kept simple.

In cases where the fitting surface of at least either one of the first fitting part and the second fitting part is constituted as a fitting surface inclined with respect to the direction along which the two cassette shell halves are moved towards each other and fitted to each other, the fitting accuracy is high, and the fitting operation can be carried out easily.

BRIEF DESCRIPTION OF THE DRAWINGS

FIGS. 5, 5A, and 5B are explanatory views showing two cassette shell halves in a third embodiment of the magnetic disk cartridge in accordance with the present invention.

DESCRIPTION OF THE PREFERRED EMBODIMENTS

The present invention will hereinbelow be described in further detail with reference to the accompanying drawings.

Figure 1:
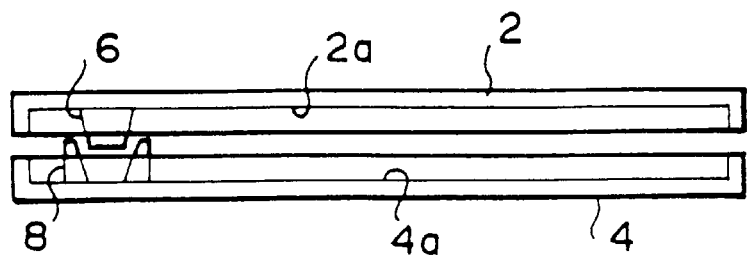
FIG. 1 is a sectional side view showing two cassette shell halves in a first embodiment of the magnetic disk cartridge in accordance with the present invention.
Figure 2:
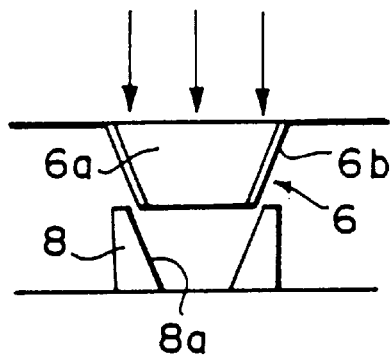
FIG. 2 is an enlarged sectional side view showing a major part of FIG. 1.
Figure 3:
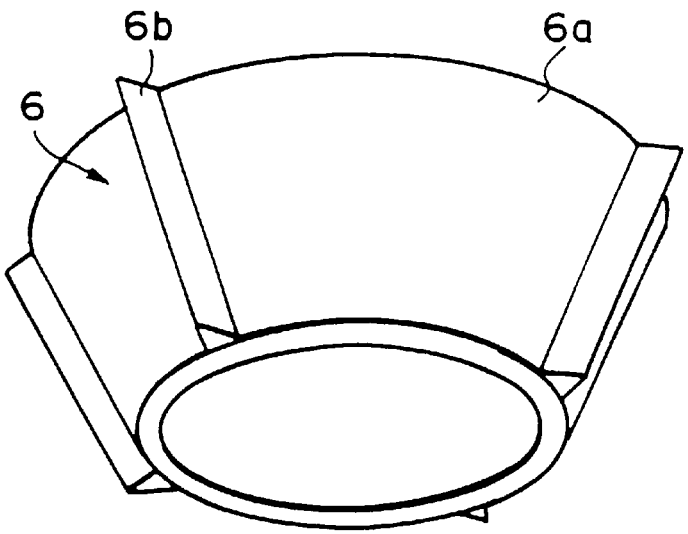
FIG. 3 is an enlarged perspective view showing part of FIG. 2, FIGS. 4 and 4B are explanatory views showing two cassette shell halves in a second embodiment of the magnetic disk cartridge in accordance with the present invention.

A first embodiment of the magnetic disk cartridge and the process for producing a magnetic disk cartridge in accordance with the present invention will be described hereinbelow with reference to FIGS. 1, 2, and 3. FIG. 1 is a sectional side view showing two cassette shell halves in the first embodiment of the magnetic disk cartridge in accordance with the present invention. FIG. 2 is an enlarged sectional side view showing a primary part of FIG. 1. FIG. 3 is an enlarged perspective view showing part of FIG. 2.

As illustrated in FIG. 1, in this embodiment, a cassette shell is formed by welding a cassette shell half 2 and a cassette shell half 4 to each other. A first fitting part 6 is formed on an inner surface 2a of the cassette shell half 2. The first fitting part 6 serves to adjust the position of the cassette shell half 2 with respect to the position of the cassette shell half 4. A second fitting part 8, which is to be fitted to the first fitting part 6, is formed on an inner surface 4*a* of the cassette shell half 4. Also, projections 6*b*, for ultrasonic welding are formed on a fitting surface 6*a* of the first fitting part 6. As illustrated in FIG. 2, while the first fitting part 6 and the second fitting part 8 are being fitted to each other, a pressure is applied onto the first fitting part 6 from the direction indicated by the arrows, and ultrasonic vibration is imparted in this direction. In this manner, energy of the ultrasonic welding is concentrated upon the projections 6*b*, 6*b*, . . . for ultrasonic welding, and the two cassette shell halves 2 and 4 are welded to each other.

When the two cassette shell halves 2 and 4 are fitted to each other in order to form the cassette shell, the first fitting part 6 and the second fitting part 8 are fitted to each other and serve as a combination of a positioning pin and a pin receiver for adjusting the positions of the two cassette shell halves 2 and 4 with respect to each other. For these purposes, as illustrated in FIGS. 2 and 3, the fitting surface 6*a* of the first fitting part 6 is constituted of a surface having a circular cone-like shape and is fitted to a recessed fitting surface (receiving surface) 8*a* of the second fitting part 8, which fitting surface 8*a* is constituted of a surface having a circular cone-like shape. Such that the fitting surfaces 6*a* and 8*a* may serve as the welding surfaces for the ultrasonic welding, the fitting surfaces 6*a* and 8*a* are inclined with respect to the direction along which the two cassette shell halves 2 and 4 are moved towards each other and fitted to each other. The projections 6*b*, for ultrasonic welding are formed on the inclined fitting surface 6*a*. From the viewpoint of reliability of the position adjustment, or the like, the fitting surfaces 6*a* and 8*a* are inclined with respect to the direction along which the two cassette shell halves 2 and 4 are moved towards each other and fitted to each other, should preferably be constituted of surfaces of circular cone-like shapes capable of fitting to each other and having their axes extending in the direction along which the two cassette shell halves 2 and 4 are moved towards each other and fitted to each other.

Therefore, the fitting parts 6 and 8 serve both as a combination of a positioning pin and a pin receiver and include projections for welding. Accordingly, it is not necessary for independent projections for the ultrasonic welding to be provided in addition to the combination of the positioning pin and the pin receiver.

In the aforesaid embodiment, the fitting parts 6 and 8 have the circular cone-like shapes. Alternatively, the fitting parts 6 and 8 may have pyramidal shapes, such as triangular pyramid-like shapes or quadrangular pyramid-like shapes. Each of the fitting surfaces 6*a* and 8*a* constituted of the surfaces having the circular cone-like shapes, or the like, need not necessarily extend over the entire circumference. For example, each fitting surface may be constituted of a plurality of surface portions, into which the entire circumferential surface is divided.

As the fitting parts 6 and 8, which serve both as the means for adjusting the positions of the two cassette shell halves 2 and 4 with respect to the X and Y directions and as the projections for the welding, only a single set of the fitting parts 6 and 8 are formed in a single cassette shell, and two or more sets of the fitting parts need not necessarily be formed in a single cassette shell. The single set of the fitting parts 6 and 8 should preferably be located on the reference dimension side of the cassette shell. In cases where two or more sets of the fitting parts are formed in a single cassette shell, if their positions are not adjusted accurately, looseness or other defects may occur in the product.

As described above, a single set of fitting parts, which include the projections for the position adjustment and as the projections for the welding, may be located on the reference dimension side of the cassette shell. Besides such a single set of fitting parts, second set of fitting parts, which include projections for the position adjustment and for the welding may be located on the side opposite to the reference dimension side of the cassette shell. Such embodiments will be described hereinbelow with reference to FIGS. 4 and 5.

Figures 4A, 4B:
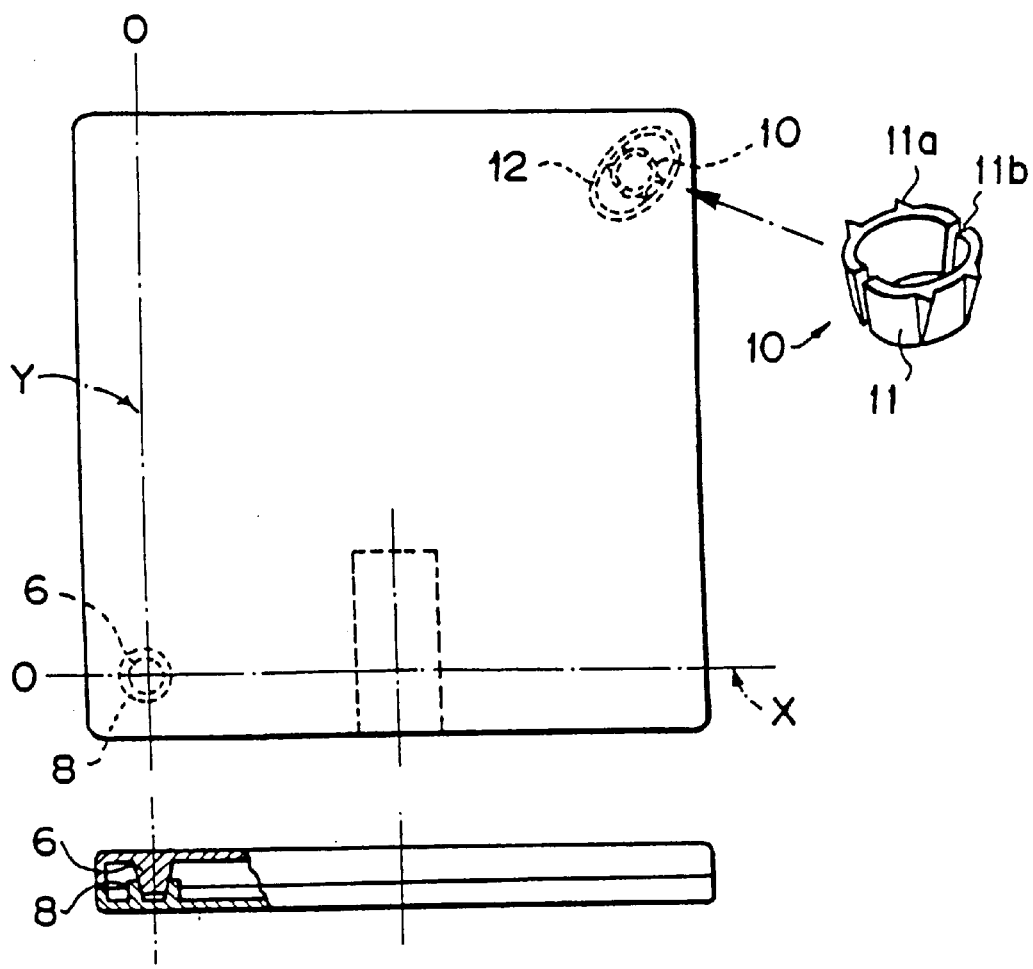

In a second embodiment of FIG. 4, the set of the circular cone first fitting part 6 and the second fitting part 8, which are employed in the first embodiment shown in FIGS. 1, 2, and 3, are located at the reference position with respect to the X and Y directions. Also, a set of a first fitting part 10 and a second fitting part 12, which include projections for the position adjustment and for the welding, are located at the position opposite to the reference position with respect to the diagonal line direction of the cassette shell. As illustrated at the right of FIG. 4, the first fitting part 10 comprises a fitting protrusion 11, which takes on the form of a circular cone-shaped tube or a cylindrical tube split into two pieces with a split gap 11*b* intervening therebetween, and projections 11*a*, for ultrasonic welding, which are projected from the circumferential surface of the fitting protrusion 11 and only in the direction perpendicular to the plane of the split gap 11*b*. The second fitting part 12 takes on the form of an approximately elliptic cone-shaped tube having its major axis extending along the plane of the split gap 11*b* and receives the first fitting part 10 therein. The first fitting part 10, which is a circular cone-shaped tube, and the second fitting part 12, which is an approximately elliptic cone-shaped tube, can be fitted and welded to each other while relief for the fitting is being provided along the direction of the plane of the split gap 11*b* (i.e., along the major axis direction of the approximately elliptic cone-shaped tube) and while slight relief for the welding is being provided in the direction perpendicular to the plane of the split gap 11*b*.

In the second embodiment of FIG. 4, conical fitting parts are employed. Alternatively, as in a third embodiment shown in FIG. 5, pyramidal fitting parts may be employed.

Figures 5A, 5B:
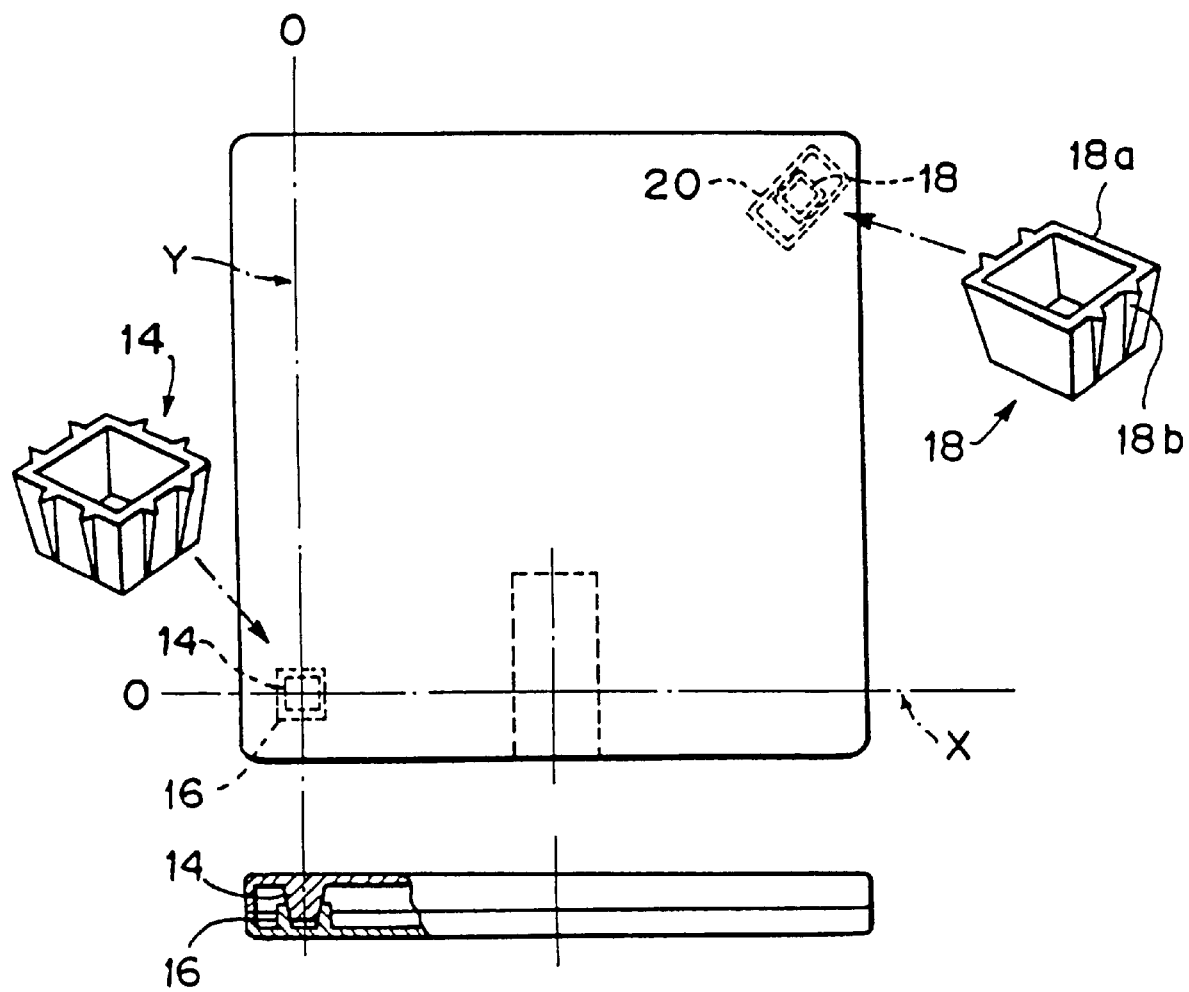

In the third embodiment of FIG. 5, pyramidal fitting parts are utilized in lieu of the conical types of the fitting parts employed in the second embodiment of FIG. 4. Specifically, as illustrated at the right of FIG. 5, a pyramidal first fitting part 14 and a second fitting part 16, which has a pyramidal inner receiving surface and which receives the first fitting part 14, are located at the reference position with respect to the X and Y direction. Also, a set of a first fitting part 18 and a second fitting part 20, which includes the projections for the position adjustment and for the welding are located at the position opposite to the reference position with respect to the diagonal line direction of the cassette shell. As illustrated at the right of FIG. 5, the first fitting part 18 comprises a fitting protrusion 18*a*, which is a pyramidal tube or a prismatic tube, and projections 18*b*, 18*b*, . . . for ultrasonic welding, which are projected from the peripheral surface of the fitting protrusion 18*a* and only in the direction perpendicular to the direction of the diagonal line of the cassette shell. The second fitting part 20 is a pyramidal tube having a rectangular cross section and receives the first fitting part 18 therein. The first fitting part 18, and the second fitting part 20, can be fitted and welded to each other while relief for the fitting is being provided along the direction of the major axis of the rectangle (i.e., along the direction of the diagonal line of the cassette shell).

In the second and third embodiments of FIGS. 4 and 5, each set of the fitting parts are of the conical types, or each set of the fittings are of the pyramidal types. Alternatively, in each set of the fitting parts, the fitting parts may have different shapes. For example, a cylindrical or prismatic pin may be fitted to a conical or pyramidal receiving surface. Alternatively, a conical or pyramidal pin may be fitted to a cylindrical or prismatic receiving surface.

What is claimed is:

1. A process for manufacturing a magnetic disk cartridge, in which a first cassette shell half and a second cassette shell half which comprise a cassette shell of a magnetic disk cartridge are moved towards each other in an axial direction, fitted to each other, and welded to each other, a magnetic disk being incorporated in the cassette shell such that the magnetic disk can rotate, comprising the steps of:

i) forming a first fitting part on a first inner surface of said first cassette shell half, said first fitting part projecting from said first inner surface in said axial direction and having a first inclined fitting surface in order to adjust the position of said first cassette shell half with respect to the position of said second cassette shell half, ii) forming a second fitting part on a second inner surface of said second cassette shell half, said second fitting part projecting in said axial direction from said second inner surface having a second inclined fitting surface which is fitted to said first fitting part by seating and at least partly encompassing said first fitting part within said second fitting part, in order to adjust the position of said first cassette shell half to said second cassette shell half;

wherein in steps i) and ii), at least one of said first inclined fitting surface and said second inclined fitting surface is one of conical and pyramidal in shape; and iii) forming a plurality of projections for ultrasonic welding that extend outwardly in a perpendicular direction from said at least one of said first and second inclined fitting surfaces, and iv) while said first inclined fitting surface and said second inclined fitting surface of said first fitting part and said second fitting part are being fitted to each other, concentrating energy of ultrasonic welding upon said plurality of projections to weld said first cassette shell half and said second cassette shell half to each other.

2. A process as defined in claim 1, wherein said first fitting part and said second fitting part comprise a first set, said process further comprising:

forming a second set of a first fitting part and a second fitting part, which enable relative movement in a desired direction, at a position opposite to the position of the first set with respect to a diagonal line direction of the cassette shell, said first fitting part of the second set being formed on an inner side of said first cassette shell half and serving to adjust the position of said first cassette shell half with respect to the position of said second cassette shell half, said second fitting part of the second set being formed on an inner side of said second cassette shell half and being adapted to fitting to said first fitting part of the second set in order to adjust the position of said second cassette shell half with respect to the position of said first cassette shell half, and forming projections for ultrasonic welding on at least one of said first inclined fitting surface and said second inclined fitting surface of at least one of said first fitting part and said second fitting part of the second set.

3. A process as defined in claim 2, wherein in said steps (i) and (ii), one of said first fitting part and said second fitting part of the second set is formed as a fitting protrusion, which is one of a circular cone-shaped tube and a cylindrical tube having its axis along which the first cassette shell half and said second cassette shell half are moved towards each other and fitted to each other, and the other fitting part of the second set is an approximately elliptic cone-shaped tube and receives said one fitting part of the second set therein.

4. A process as defined in claim 3 further comprising splitting said one of circular cone-shaped tube and said cylindrical tube into two pieces with a split gap intervening therebetween, and said approximately elliptic cone-shaped tube has a major axis extending along the plane of the split gap.

5. A process as defined in claim 4 wherein in said step (iii) said projections are formed on said fitting protrusion for ultrasonic welding, said projections being projected from the circumferential surface of the fitting protrusion and projecting only in a direction perpendicular to the plane of the split gap.

6. A process as defined in claim 2, wherein one of said first fitting part and said second fitting part of the second set comprises a fitting protrusion defined by forming one of a pyramidal tube and a prismatic tube having its axis extending in said first direction along which the first cassette shell half and second cassette shell half are moved towards each other and fitted to each other, and the other fitting part of the second set is defined by forming a pyramidal tube having a rectangular cross section and receives said one fitting part of the second set therein.

7. A process as defined in claim 6 wherein in said step (iii) said projections are formed on said fitting protrusion for ultrasonic welding, said projections being projected from the peripheral surface of the fitting protrusion and only in the direction perpendicular to the direction of the diagonal line of the cassette shell.

8. A magnetic disk cartridge, in which a first cassette shell half and a second cassette shell half are moved towards each other in an axial direction, fitted to each other, and welded to each other by ultrasonic welding to comprise a cassette shell, comprising:

a first fitting part being formed on a first inner surface and projecting in said axial direction from said first inner surface of said first cassette shell half said first fitting part having a first inclined fitting surface in order to adjust the position of said first cassette shell half with respect to the position of said second cassette shell half, a second fitting part being formed on a second inner surface and projecting in said axial direction from said second inner surface of said second cassette shell half, said second fitting part having a second inclined fitting surface and being fitted to said first fitting part by seating and at least partly encompassing said first fitting to part within said second fitting part in order to adjust the position of said second cassette shell half;

wherein at least one of said first inclined fitting surface and said second inclined fitting surface is one of conical and pyramidal in shape; and a plurality of projections provided for ultrasonic welding, formed on said at least one of said first inclined fitting surface and said second inclined fitting surface and extending outwardly in a perpendicular direction to said first inclined fitting surface and said second inclined fitting surface, wherein only a part of each of said plurality of projections is made molten by application of an ultrasonic vibration, to allow only said ultrasonic welding to be completed between the first and second fitting parts of said first cassette shell half and said second cassette shell half.

9. A magnetic disk cartridge as defined in claim 8, wherein said first fitting part and said second fitting part comprise a first set, said cartridge further comprising:

a second set of a first fitting part and a second fitting part, which enable relative movement in a desired direction, said second set being located at a position opposite to the position of the first set with respect to a diagonal line direction of the cassette shell, said first fitting part of the second set being formed on an inner side of said first cassette shell half and serving to adjust the position of said first cassette shell half with respect to the position of the second cassette shell half, said second fitting part of the second set being formed on an inner side of said second cassette shell half and capable of fitting to said first fitting part of the second set in order to adjust the position of said second cassette shell half with respect to the position of said first cassette shell half, projections for ultrasonic welding formed on a fitting surface of at least one of said first fitting part and said second fitting part of the second set.

10. A magnetic disk cartridge as defined in claim 9 wherein one of said first fitting part and said second fitting part of the second set comprises a fitting protrusion which is one of a circular cone-shaped tube and a cylindrical tube extending in the axial direction, and the other fitting part of the second set is an approximately elliptic cone-shaped tube and receives said one fitting part of the second set therein.

11. A magnetic disk cartridge as defined in claim 10 wherein one of said circular cone-shaped tube and said cylindrical tube has been split into two pieces with a split gap intervening therebetween, and said approximately elliptic cone-shaped tube has a major axis extending along the plane of the split gap.

12. A magnetic disk cartridge as defined in claim 11 wherein said fitting protrusion is provided with the projections for ultrasonic welding, said projections being projected from the circumferential surface of the fitting protrusion and projecting only in the direction perpendicular to the plane of the split gap.

13. A magnetic disk cartridge as defined in claim 9 wherein one of said first fitting part and said second fitting part of the second set comprises a fitting protrusion which is one of a pyramidal tube and a prismatic tube extending in said axial direction, and the other fitting part of the second set is a pyramidal tube having a rectangular cross section which receives said one fitting part of the second set therein.

14. A magnetic disk cartridge as defined in claim 13 wherein said fitting protrusion is provided with the projections for ultrasonic welding, said projection being projected from the peripheral surface of the fitting protrusion and projecting only in the direction perpendicular to the direction of the diagonal line of the cassette shell.

* * * * *